(12) United States Patent
Ioannou et al.

(10) Patent No.: US 6,804,380 B1
(45) Date of Patent: Oct. 12, 2004

(54) SYSTEM AND METHOD FOR ACQUIRING TIE-POINT LOCATION INFORMATION ON A STRUCTURE

(75) Inventors: Dimitrios Ioannou, Fremont, CA (US); Jonathan Apollo Kung, Oakland, CA (US); Christopher Robin Thewalt, Oakland, CA (US); Mark Damon Wheeler, Oakland, CA (US)

(73) Assignee: Leica Geosystems HDS, Inc., San Ramon, CA (US)

( * ) Notice: Subject to any disclaimer, the term of this patent is extended or adjusted under 35 U.S.C. 154(b) by 0 days.

(21) Appl. No.: 09/574,713

(22) Filed: May 18, 2000

(51) Int. Cl.[7] .............................. G06K 9/00; G06K 9/62; G06K 9/36

(52) U.S. Cl. ........................ 382/103; 382/154; 382/225; 382/288

(58) Field of Search .................................. 382/103, 154, 382/285, 204, 225, 180, 151, 291, 288, 203, 201

(56) References Cited

U.S. PATENT DOCUMENTS

| | | | | |
|---|---|---|---|---|
| 5,018,214 A | * | 5/1991 | Pasch | 382/180 |
| 5,282,262 A | * | 1/1994 | Kurashige | 345/426 |
| 5,577,181 A | | 11/1996 | Givens et al. | 395/135 |
| 5,696,673 A | * | 12/1997 | Pryor | 700/66 |
| 5,850,289 A | | 12/1998 | Fowler et al. | 350/376 |
| 5,878,174 A | * | 3/1999 | Stewart et al. | 382/293 |
| 6,023,326 A | | 2/2000 | Katayama et al. | 356/141.3 |
| 6,048,105 A | | 4/2000 | Ohtomo et al. | 385/88 |
| 6,052,181 A | | 4/2000 | Maynard et al. | 356/147 |
| 6,108,497 A | * | 8/2000 | Nakayama et al. | 396/429 |
| 6,478,223 B1 | * | 11/2002 | Ackley | 235/462.04 |
| 6,611,617 B1 | * | 8/2003 | Crampton | 382/154 |

FOREIGN PATENT DOCUMENTS

| | | |
|---|---|---|
| GB | 1339027 | 12/1970 |
| JP | 61-120907 | * 6/1986 |

OTHER PUBLICATIONS

*A Technical Leap In Robotic Programming May Be On The Horizon;* by Andrew Cullison; Welding Journal, Jul. 1998; pp. 49–52.
*Rapid Laser Scanner Heralds New Advance In Terrestrial Survey;* Engineering Surveying Showcase; Apr. '99, p. 16.
*Product Bulletin;* Cyra Technologies, Inc. May 18, 1999, 6 pages.
*New Equipment, Supplies and Sevices;* Cyra Technologies Inc. Point of Beginning (POB) Magazine; Dec. 1998, p. 66.
*Products, People, Places; 3D Laser Mapping System;* Professional Surveyor Magazine; Nov./Dec. 1998, p. 62.
*Products, 3–D Laser Mapping System;* New Equipment Digest; Nov. 1998, p. 76.
*Front Page, Laser & Optronics; Laser Profiling Package;* Oct. 1998, p. 1.
*Literature & Products, Imaging System;* Power Engineering Magazine, Oct. 1998, p. 72.
*Showcase, 3–D Laser Mapping,* GPS World Magazine, Dec. 1998 Issue, vol. 9; p. 48.
*HP Innovations, Mapping System Lowers As–Built Survey Costs;* Hydrocarbon Processing Magazine; Oct. 1998, p. 35.

(List continued on next page.)

Primary Examiner—Daniel Mariam
Assistant Examiner—Shefali Patel
(74) Attorney, Agent, or Firm—Stallman & Pollock LLP

(57) ABSTRACT

An apparatus and method are described for acquiring tie-point target locations on a structure that eliminates the need for the user to manually identify features that can be used to register multiple scenes so that they share a single coordinate system. In the present invention, readily identifiable objects, known as targets, are placed on or near the structure. When the structure is scanned, the targets are identified and can then be used in other operations, such as registration.

34 Claims, 7 Drawing Sheets

OTHER PUBLICATIONS

A/E/C '98; *Expanding Horizons, Bold Initiatives, An Overview of A/E/C Systems '98*; Microstation Manager, Aug. 1998; pp. 40–43.

*Cyrax 3D Laser Scanner: Computer Aided Construction;* Cyra 3D Digital Reality; May 21, 1999, One page.

*Cyrax Laser Scanning: Fabrication; Parts Mating Analysis;* Cyra 3D Digital Reality; May 21, 1999, One page.

*Cyrax 3D Laser Scanner: High Accuracy, Long Range, Data Capture,* Cyrax System Overview; Cyra 3D Digital Reality, May 21, 1999, pp. 1–3.

Cyrax 2400 Mark 1 3D Laser Scanner; Cyrax 2400, Cyra 3D Digital Reality, May 21, 1999, pp. 1–2.

*Cyrax: Long range 3D Laser Scanner; Cyrax 2400 Specs.;* Cyra 3D Digital Reality, May 21, 1999, pp. 1–3.

Cyrax 3D Software: Automatic 2D Extraction; Cyra 3D Digital Reality, One page.

New 3D Scanner Zaps Sci–Fi Movie Set; Professional Surveyor, New Technology, Apr. 1999, pp. 5 pages.

U.S. patent application Ser. No. 60/143,695, filed Jul. 14, 1999.

U.S. patent application Ser. No. 09/177,913, filed Oct. 23, 1998, This application has been allowed and the issue fee paid on Mar. 17, 2000.

Y.D. Chen et al., "Dynamic Calibration and Compensation of a 3D Laser Radar Scanning System," Proceedings of the International Conference on Robotics and Automation Atlanta, May 2–6, 1993, Los Alamitos, *IEEE Comp. Soc. Press., US,* vol. 3, Conf. 10, May 2, 1993, pp. 652–658.

\* cited by examiner

PROJECT A RAY THROUGH CENTROID OF EACH TARGET TO DETERMINE INTERSECTION OF POINT WITH PLANE — 520

FIG. 5C

SYSTEM AND METHOD FOR ACQUIRING TIE-POINT LOCATION INFORMATION ON A STRUCTURE

BACKGROUND OF THE INVENTION

1. Field of the Invention

The present invention relates to a system and method that acquire tie-point location information on a structure and, more particularly, to a system and method that acquire tie-point location information on a structure with minimal user assistance.

2. Description of the Related Art

It is often desirable to have computer models of large physical structures, such as a petroleum refinery. Computer models facilitate an understanding of the structure that is beneficial in a number of ways, including facilitating an understanding of how materials flow through the structure.

The computer models are constructed by acquiring geometric information about the to-be-modeled structure. One technique for acquiring the geometric information is to use a laser scanning system. In a laser scanning system, the to-be-modeled structure is scanned with a laser from a plurality of views.

Each scan includes a plurality of scan points that cover a view of the structure. Each scan point has a measured location in 3D space, usually in terms of an (x,y,z) point in the scanner's local coordinate system. In some cases, the 3D point data also includes data that indicates the intensity of the laser light reflected from the point.

When a view is scanned, the laser scanning system generates 3D point data for a large number of points. The resulting collection of points is often called a point cloud. The point cloud typically has points that lie on many different surfaces, depending on the view that was scanned. For example, a scan taken at a petroleum refinery may include a point cloud that has points on pipes, elbows, valves, pumps, and structural steel members.

Once each view of the structure has been scanned, the 3D point data are processed to generate a computer model of the structure. One of the first processing steps, known as scan registration, combines the views together so that the points from each view share a common coordinate system. For example; scan registration combines a view of the front-left side of a structure and a view of the front-right side of the structure so that both views share a common coordinate system. The registration process calculates the transformation needed to bring each scan into a desired coordinate system, and then applies the transformation to the 3D scan data to give a new collection where all scans share the same coordinate system.

Most conventional scan registration methods use a constraint-based approach, where the first step in the scan registration process is the identification of a number of constraints. Constraints are created by matching features that a number of views share in common. For example, matching points in different views can be used to create a constraint. In addition, co-linear or parallel lines in different views can be used to create a constraint, and co-planar or parallel planes in different views can be used to create a constraint. If points are matched to form a constraint they are often called tie points because they tie the data sets together.

In addition, objects can be modeled, and then a feature of the model used to create a constraint. For example, views of a petroleum refinery may each include a cylindrical storage tank or a spherical gas tank. In these cases, the user can model the cylindrical storage tank or the spherical gas tank in each view, find the centerlines of cylinders or the centers of the spheres, and match these features in the different views to create constraints.

Once the constraints have been identified, they can be used in a registration process that determines the optimal transformations for each data set so that the identified matching features join as closely as possible. Each view must share a number of constraints to solve for the rigid body transformation, and the minimum number of constraints required depends on the type of constraint (point or line). For example, if two views include three spherical gas tanks, the spherical gas tanks in each view can be modeled to find the points at the centers of the three spheres. Having the three matching points is enough to solve the rigid body transformation problem. It should be noted that constraints can also be formed by matching features from scan data with features acquired through some other mechanism, such as surveying. A sphere could be scanned and its center point determined. A constraint could then be formed between that center point location and the surveyed position of the sphere center point. The resulting registration transformation can be used to bring the scan data into the survey coordinate system.

One of the problems with conventional scan registration methods is that it is often a time consuming process to identify the features that can be used to create the constraints. Lines and planes are often difficult to find from the large number of points that make up a view. Geometric shapes, such as a cylinder or a sphere, are also difficult to find and, once found, frequently require a significant amount of time to model. Thus, there is a need for an apparatus and method for acquiring tie-point location information on a structure that reduces or eliminates the need for the user to manually identify features for use in creating constraints.

SUMMARY OF THE INVENTION

The present invention provides a system and method for acquiring tie-point location information on a structure that reduces or eliminates the need for the user to manually identify features for use in creating constraints. In the present invention, readily identifiable objects, known as tie-point targets, are applied to the structure. When the structure is scanned, the tie-point targets are identified and can be utilized to create registration constraints.

The system of the present invention includes a plurality of tie-point targets and a laser. The laser scans the structure with a laser beam to generate a plurality of points. The laser beam illuminates the tie-point targets during the scan. Each point, in turn, has point data that defines a spot on a surface of the structure.

The system of the present invention also includes a computer that controls the laser and processes the plurality of points. The computer includes means for forming a number of groups of target points from the plurality of points where each group of target points has a recognizable feature. The computer also includes means for selecting a number of the groups of target points for acquisition to form a number of selected groups of target, points.

In addition, the computer includes means for forming a designated point for the recognizable feature in each selected group of target points. The designated point represents the recognizable feature in each selected group of target points. Further, the computer includes means for labeling the designated point in each selected group of target points as a tie-point location.

The method of the present invention begins with the step of affixing a plurality of tie-point targets to the structure. Following this, the structure is scanned with a laser beam to generate a plurality of points. The laser beam illuminates the tie-point targets during the scan. Each point, in turn, has point data that defines a spot on a surface of the structure. The method also includes the step of forming a number of groups of target points from the plurality of points where each group of target points has a recognizable feature.

In addition, the method includes the step of selecting a number of groups of target points for acquisition to form a number of selected groups of target points. Further, a designated point is formed for the recognizable feature in each selected group of target points. The designated point represents the recognizable feature in each selected group of target points. The method also includes the step of labeling the designated point in each selected group of target points as a tie-point location.

A better understanding of the features and advantages of the present invention will be obtained by reference to the following detailed description and accompanying drawings that set forth an illustrative embodiment in which the principles of the invention are utilized.

BRIEF DESCRIPTION OF THE DRAWINGS

FIGS. 5A–5C are flow charts illustrating a method 500 for searching to find tie-point targets in accordance with the present invention.

DETAILED DESCRIPTION

The present invention is directed to, an apparatus and method for acquiring tie-point location information on a structure. As described in greater detail below, the present invention utilizes readily identifiable objects, known as tie-point targets, which are applied to the structure. When the structure is scanned, the tie-point targets are identified with little or no input from the user, and can then be utilized to form registration constraints.

Figure 1:
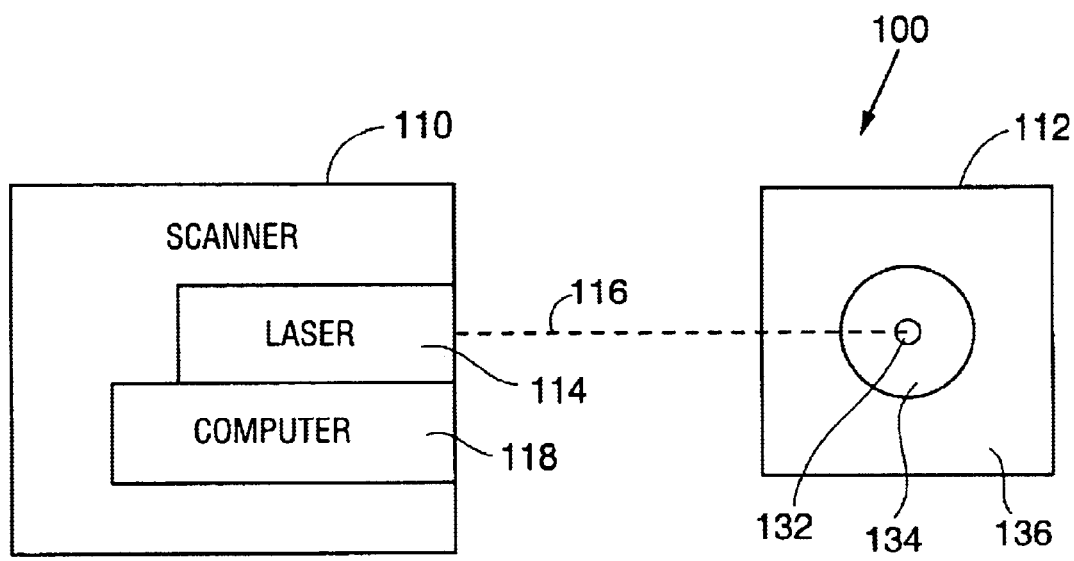
FIG. 1 is a sketch illustrating a scanning system 100 in accordance with the present invention.

FIG. 1 shows a sketch that illustrates a scanning system 100 in accordance with the present invention. As shown in FIG. 1, system 100 includes a scanner 110 and a number of tie-point targets 112 (only one of which is shown in FIG. 1).

Figure 2:
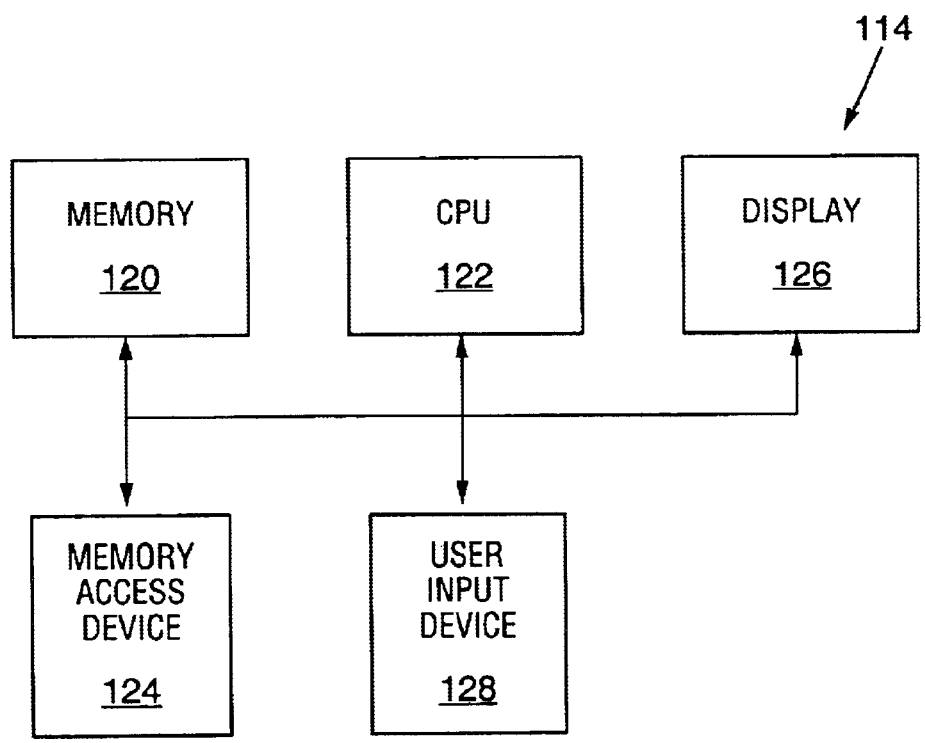
FIG. 2 is a block diagram illustrating computer 114 in accordance with the present invention.

Scanner 110, in turn, includes a laser 114 that outputs a laser beam 116, and a computer 118 that controls the operation of scanner 110 and laser 114. FIG. 2 shows a block-diagram that illustrates computer 114 in accordance with the present invention. As shown in FIG. 2, computer 114 includes a memory 120 that stores program instructions, measured data, and 3D point data.

The measured data includes location information, typically given as (x,y,z) coordinates in the scanner's local coordinate system, and intensity—the intensity of the reflected laser beam when the point was measured.

As further shown in FIG. 2, computer 114 also includes a central processing unit (CPU) 122 that is connected to memory 120. CPU 122 generates the 3D point data by processing the measured data in response to the program instructions and input from a user.

Further, computer 114 includes a memory access device 124, such as a disk drive or a networking card, which is connected to memory 120 and CPU 122. Memory access device 124 allows the program instructions to be transferred to memory 120 from an external medium, such as a disk or a networked computer. In addition, device 124 allows the measured data or the 3D point data from memory 120 or CPU 122 to be transferred to the external medium.

In addition, computer 114 includes a display system 126 that is connected to CPU 122. Display system 126 displays images to the user which are necessary for the user to interact with the program. Computer 114 also includes a user-input device 128, such as a keyboard and a pointing device, which is connected to CPU 122. The user operates input device 128 to interact with the program.

As noted above, system 100 also includes a number of tie-point targets 112. As shown in FIG. 1, a target 112 includes a highly reflective center region 132, a lowly reflective middle region 134 that surrounds center region 132, and a moderately reflective outer region 136 that surrounds middle region 134.

The size of target 112 and the resolution of the scan can be set to any two values as long as at least one point (and preferably more) lands on the target when the structure is scanned. For example, if the horizontal resolution of the scan is 25 mm, target 112 is conveniently sized to be square with 75 mm sides. In addition, target 112 is conveniently formed to have a circular middle region with a 30 mm diameter, and a circular center region with a 1.5 mm diameter. Middle region 134 can be formed with matte white paper, while the center and outer regions can be formed with retro-reflective material.

Figure 3:
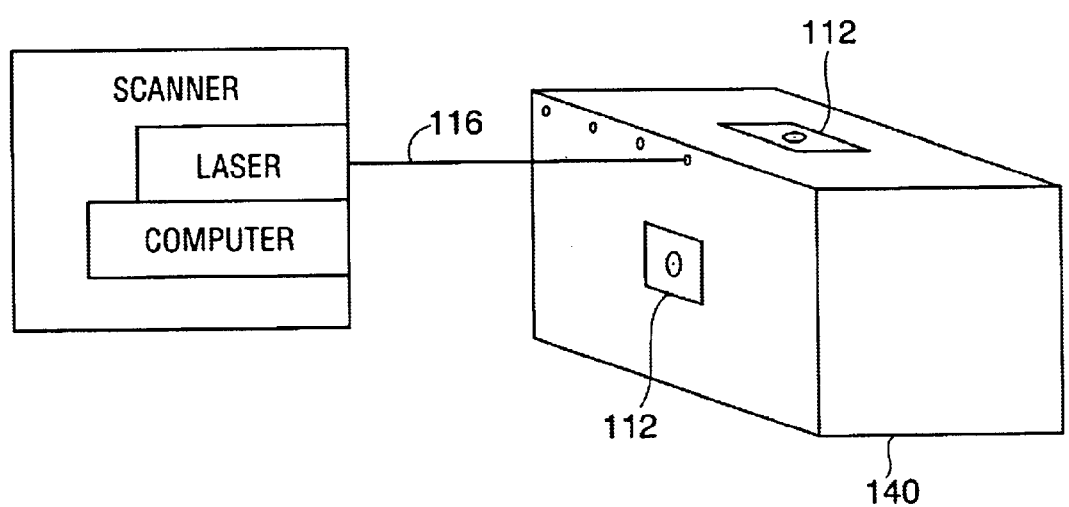
FIG. 3 is a sketch illustrating the operation of system 100.

FIG. 3 shows a sketch that illustrates the operation of system, 100. As shown in FIG. 3, targets 112 are applied to a to-be-scanned structure, such as structure 140. In addition, scanner 110, is positioned to scan a view of structure 140. Following this, scanner 110 is turned on, and a user is presented with a control screen on display 126. From the control screen, the user defines a number of variables.

One of the user-defined variables is the indication of the desired scan area. Another of the user-defined variables is the selection of a scan resolution, i.e., the point density. In addition, as explained in greater detail below, the user must also define an intensity threshold value, a first predefined distance, and a second predefined distance.

After the variables have been entered, the user commands scanner 110 to scan structure 140. Laser beam 116 scans structure 140, while a receiver in laser 114 measures, along with other values, the intensity of the reflected laser beam. When laser 114 measures points that lie on one of the targets 112, a noticeable change in intensity results.

Scanner 110 collects the measured data, which is processed to form the 3D data by computer 118. The scan and subsequent processing generates 3D data for a large number of points. Following the generation of the 3D data, the user commands computer 114 to search for tie-point targets 112.

Figure 4A:
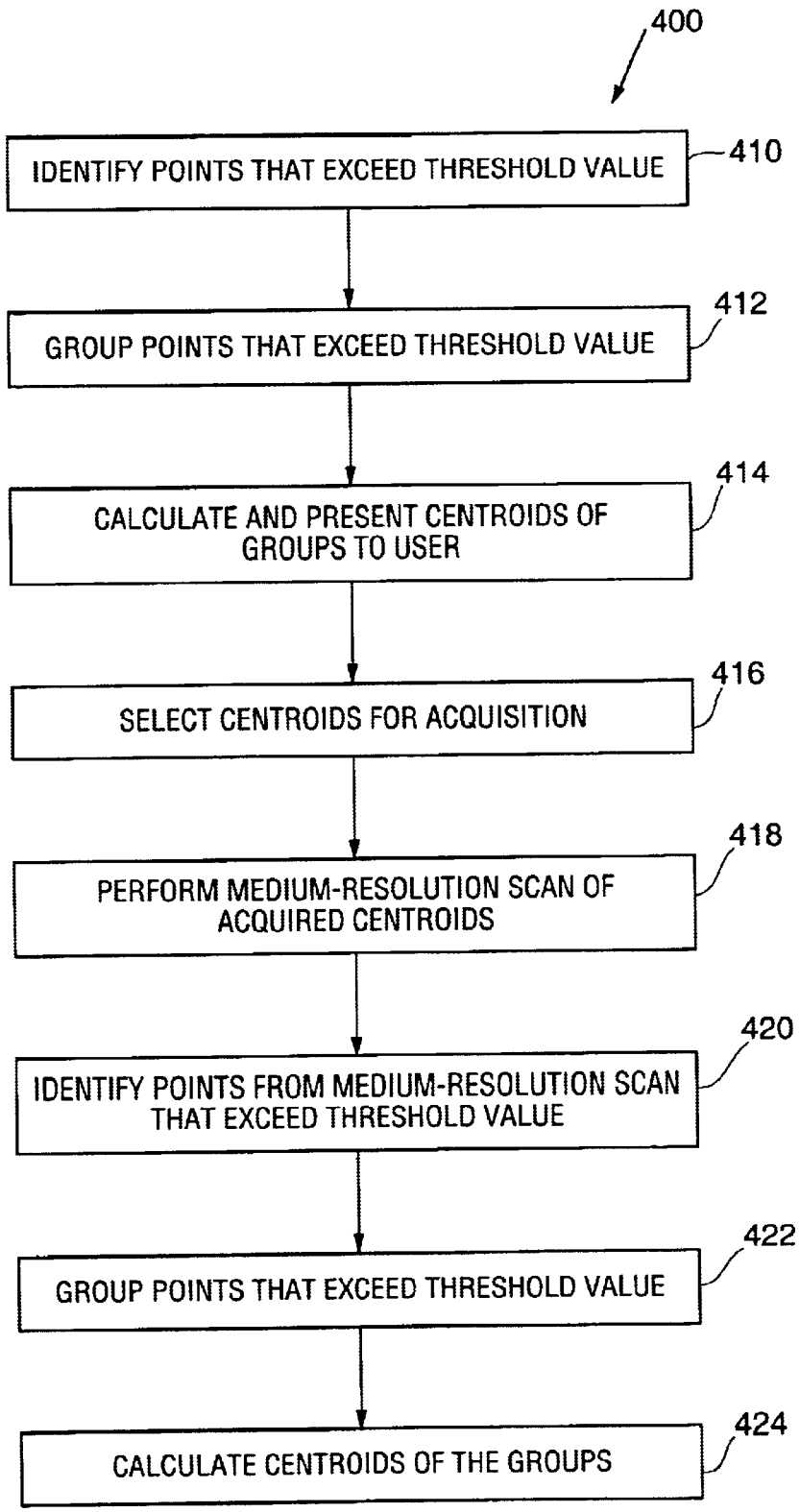
FIGS. 4A–4B are flow charts illustrating a method 400 for searching to find tie-point targets in accordance with the present invention.
Figure 4B:
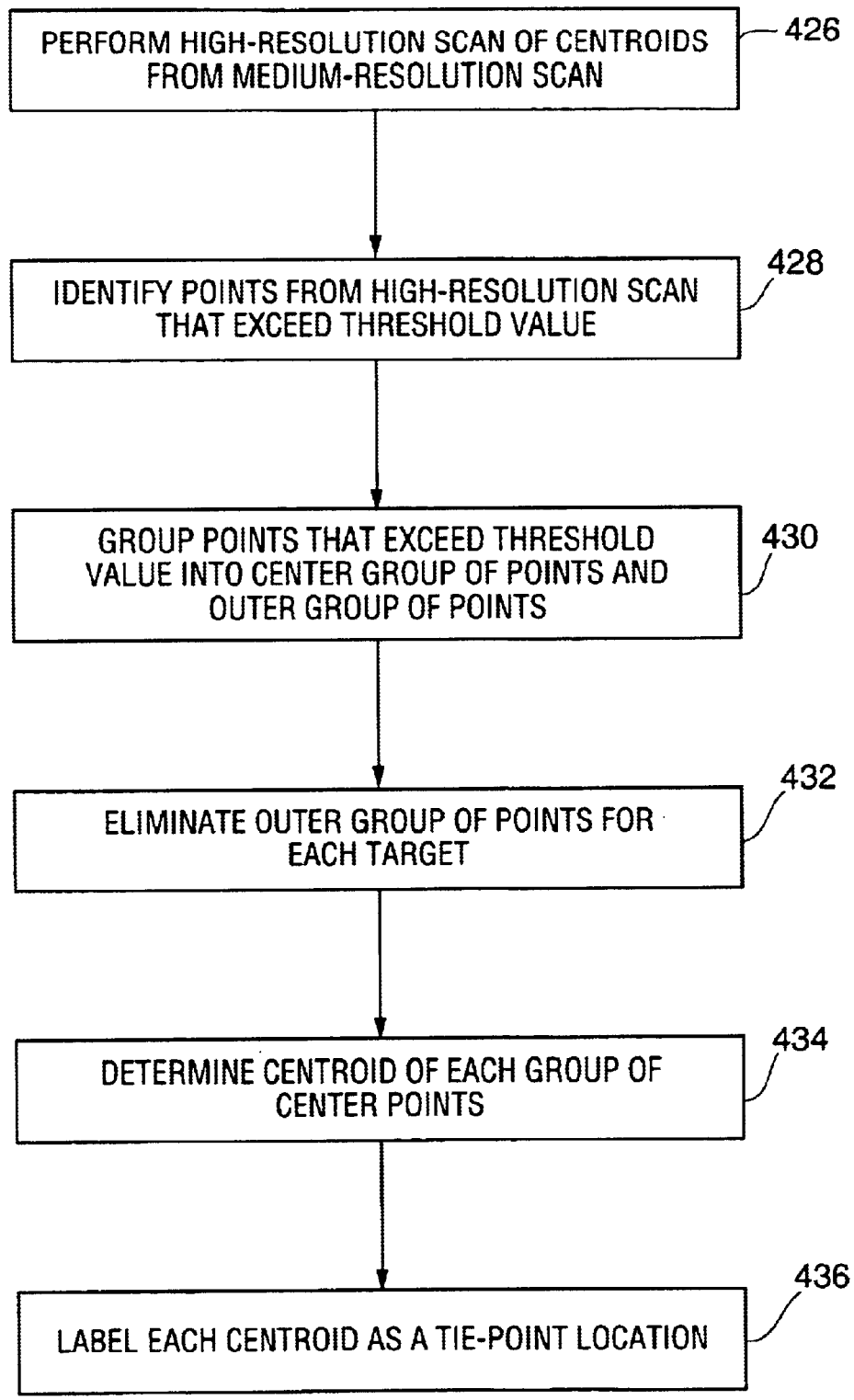

The tie-point target search method of the present invention is implemented in software that is programmed into computer 114. FIGS. 4A–4B show a flow chart that illustrates a method 400 for searching to find tie-point targets in accordance with the present invention. As shown in FIGS. 4A–4B, method 400 of the present invention begins at step 410 by evaluating each point in the scan to identify the points that exceed an intensity threshold. If the intensity of a point is higher than the threshold value (a user-defined variable), then the point is assumed to be from a tie-point target and is added to a group of high-intensity points. Points from other objects in a scene typically have far lower intensities. It is also possible to automatically set the threshold value by using statistical techniques, such as preparing a histogram of the intensity values to determine an appropriate threshold between low and high intensity, thereby removing the need for the user to supply a threshold intensity value.

Once the group of high-intensity points has been formed, method 400 moves to step 412 to assign the high-intensity points to groups of target points. The first point to exceed the threshold value forms a first group of target points. The second point to exceed the threshold value is added to the first group of target points if the second point is within a first predefined distance of the first point. Each succeeding point to exceed the threshold value is added to the first group if the succeeding point is within a second predefined distance of the centroid of the points within the first group.

If the second point to exceed the threshold value is not within the first predefined distance, the second point forms a second group of target points. Similarly, if a succeeding point is not within the second predefined distance, the succeeding point forms a succeeding group of target points.

Thus, as each point that lies on a tie-point target is detected, the point is compared with the groups of other detected points. If the detected target point falls within the second predefined distance of the centroid of an existing group, the target is added to the group. If the point is not within the second predefined distance of the centroid of any existing group, then a new group is formed, and the point is added to the new group.

The second predefined distance must account for the size of target 112. For example, a target that is 75 mm square has a diagonal of approximately 110 mm. Thus, if points lie within 110 mm of the centroid of a group, the points are added to the group. After the high-intensity points have been grouped, method 400 moves to step 414. In step 414, the centroid of each group of target points, which is a recognizable feature from each group of target points, is calculated and presented to the user via display 126 after all of the high-intensity points have been assigned.

Method 400 next moves to step 416 where the user must review each centroid and decide whether to select the centroid for subsequent acquisition, or reject the centroid so that it will not be considered in subsequent steps. The user can elect not to acquire a centroid if the system has identified some high intensity points that are not from targets 112. System 100 can be configured to acquire a centroid once a centroid has been selected, or to acquire a centroid only after the user has decided to acquire or not acquire each of the displayed centroids. The acquisition process is described in the remaining steps.

In addition, the system could also be configured to form metrics on the groups of points to reject groups that are not tie-point targets. For example, if the points in a group are meshed and the calculated surface area is substantially larger than the area of a tie-point target, system 100 rejects (does not acquire) the centroid as being something other than a tie-point target.

Once the user has identified the points to be acquired, method 400 moves to step 418 to perform a medium-resolution scan centered on each selected centroid. For example, when a 75 mm square target is utilized, a resolution of 3 mm with a scan area of 150 mm×150 mm is conveniently used. A resolution of 3 mm insures that the targets are thoroughly scanned whereas the 25 mm resolution used in the initial scan insured that the targets would be detected.

The medium resolution scan area is larger than a tie-point target area because there may only be one point on the outer edge of the target. For example, if a group contains only a single point that is on the outer edge of a 75 mm square target, by placing the single point at the center of the 150 mm×150 mm scan area, the target is guaranteed to be scanned.

Alternately, if the original scan provided enough points on the tie point target to prepare an estimate of the target center location, the medium resolution scan can be skipped. For example, the user could specify an acceptable number of points on each target, for instance 100, that would be sufficient to estimate the center location accurately enough to proceed directly to a high-resolution scan. If the medium resolution scan is skipped, the method moves from step 416 to step 424, using the original resolution scan centroids in place of the medium resolution scan centroids.

Once the medium resolution scan has been completed, method 400 moves to step 420 to identify the points in the medium resolution scan that have an intensity that exceeds the threshold value. Method 400 then moves to step 422 to group the points in step 420. A number of equivalent approaches can be used to group the points in step 422.

For example, when scanner 110 utilizes a grid-based approach, where points are measured at regular intervals, a conventional connected region grouping algorithm that uses the gridded nature of the scan can be used. The scan is gridded into a collection of scan lines, so although the points are really 3D, it is possible to work with the points using connectivity information from the 2D scan grid. Using this gridding information allows many well known 2D image processing operations to be applied to the scan data, such as connected region grouping operation described above.

After the points have been grouped, method 400 moves to step 424 where the centroid of each group from step 422 is calculated. Using data from the medium resolution scan, the target center location can be estimated in a number of different ways.

For example, an estimate could be based on the centroid of the point group of step 422. Alternately, image recognition algorithms can be used to position the known size of the target in the observed data (again using the different intensities on the different parts of the target). In addition, scan line sequence algorithms can also be used to make an estimate based on the sequence of dim and bright points along each scan line. Only if the scan line crosses inner region 132 will the points appear to go from bright to dim and back to bright again on one scan line. In addition, this pattern will only be seen on a few adjacent scan lines. Additional equivalent examples of means of estimating the target center location are known to those skilled in the art.

Once the centroids have been calculated, method 400 moves to step 426 to perform a high-resolution scan centered on the center estimate from step 424. For example, when a 75 mm square target is utilized, a resolution of 0.5 mm with a scan area of 30 mm×30 mm is conveniently used. A resolution of 0.5 mm insures that the centers of the targets are thoroughly scanned whereas the 3 mm resolution used in the previous scan insured that the targets would be thoroughly scanned. Thus, the high-resolution scan collects a large number of points from center region 132, a large number of points from middle region 134, and a number of points from outer region 136.

Once the high-resolution scan has been completed, method 400 moves to step 428 to identify the points in the high-resolution scan that have an intensity that exceeds the threshold value. Points that lie on center region 132 and the outer region 134 of each target exceed the threshold value, and points that lie on medium region 134 of each target fail to exceed the threshold value.

Following this, method 400 moves to step 430 where the points that exceeded the threshold value are grouped. The points can be grouped in any conventional way. For example, a connected region procedure can be applied to the points in a grid system to form groups of points.

After the groups of points have been formed, there will be a center group of points associated with each target, and an outer group of points associated with each target where the high density scan hit the reflective outer area of the target. Method 400 then moves to step 432 to eliminate the outer group of points.

To eliminate the outer group of points, method 400 must be able to discern the center group of points from the outer group of points. A number of conventional approaches can be used to discern the two groups of points. For example, when using a gridded scanner, method 400 can discern the center group of points from the outer group by using a connected region algorithm to group the points, and then calculating the mean square radius of each group of points.

The mean square radius of each group is calculated as the sum of the squares of the distances between each point and the group centroid, divided by the number of points. Next, the group of points that has both the largest mean square radius and a mean square radius that is smaller than a predefined mean square radius is selected as the points that lie on center region 132. (The predefined mean square radius, e.g., 36 mm squared, is a function of the laser dot size.)

In addition to using the mean square radius, points that lie on center region 132 can also be discerned from points that lie on reflective outer region 136 by utilizing surface area information or location information relative to the estimated target center location.

Once the group of points lying in center region 132 of each target has been identified, method 400 moves to step 434 where the centroid of each group of center points from step 432 is calculated. The centroid calculation can be performed using weighted or unweighted point values. Points which have a greater intensity can be weighted to give more importance to the brighter points than the dimmer points. Many prior art methods exist for determining weighted and unweighted centroids.

The centroid point for each target is then labeled as a tie-point target location in step 436. The tie point can then be used for registration or other operations.

Figure 5A:
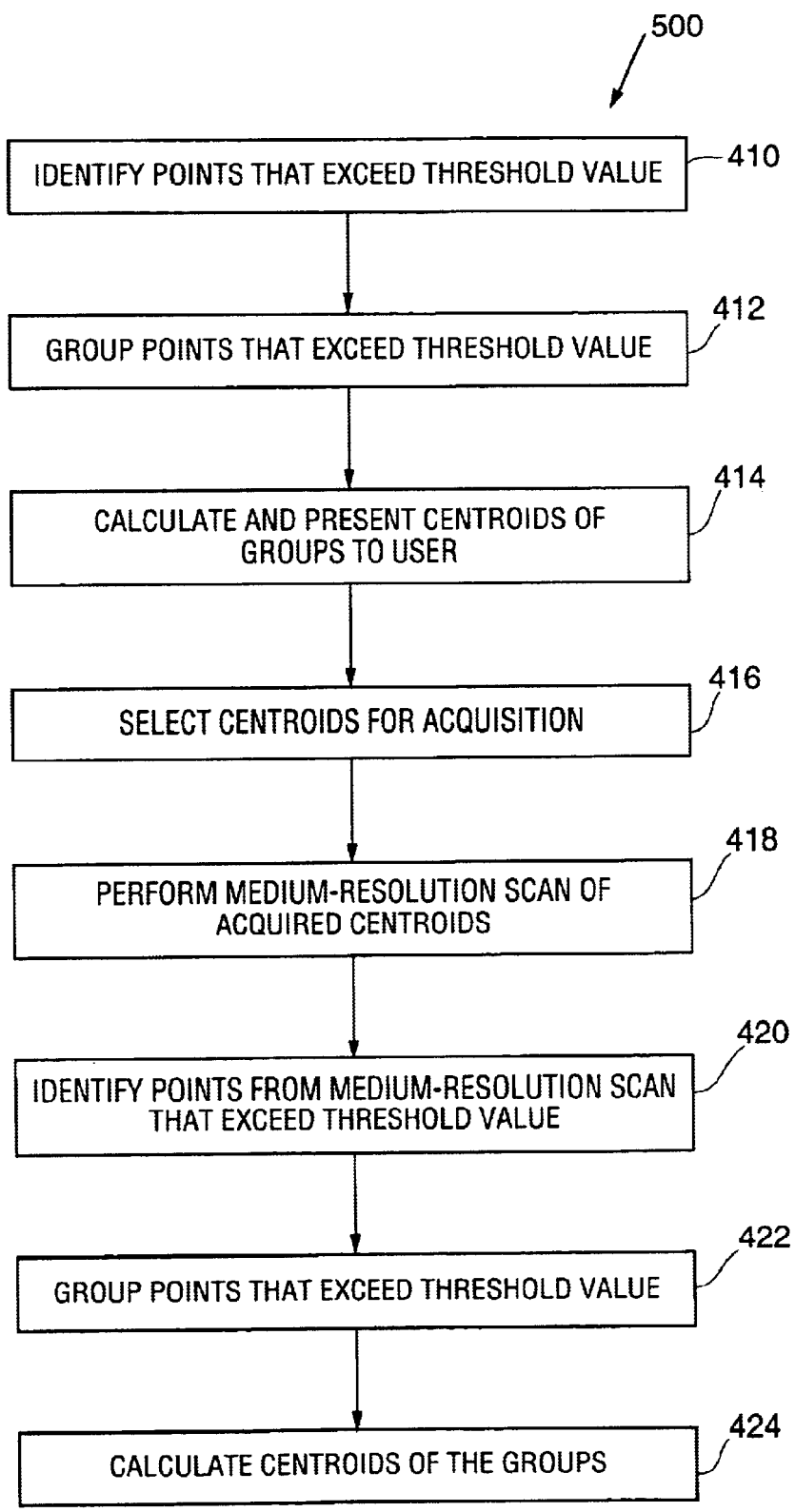
Figure 5B:
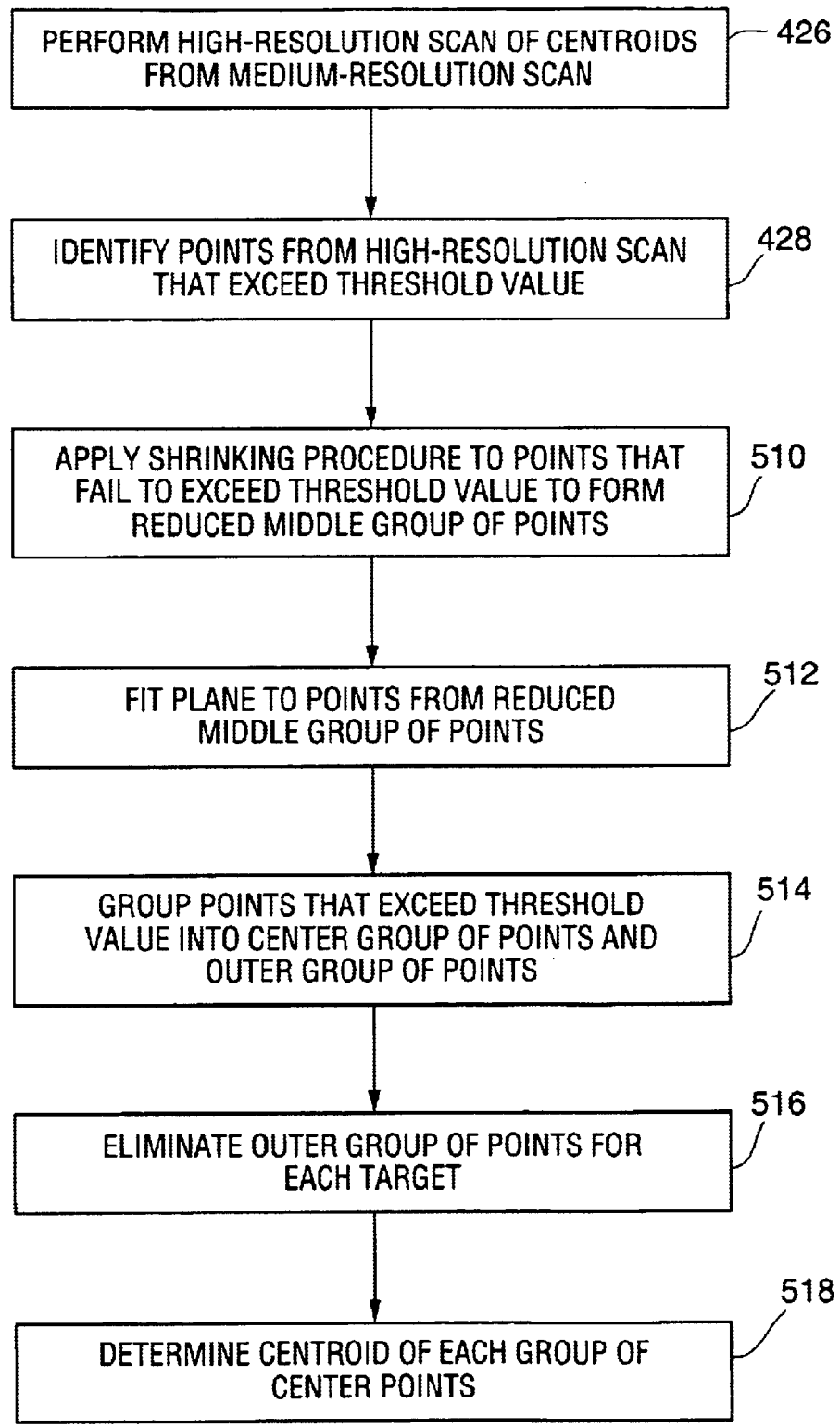

FIGS. 5A–5C show a flow chart that illustrates an alternate method 500 in accordance with the present invention. Method 500 is similar to method 400 and as a result, utilizes the same reference numerals to designate the steps that are common to both methods.

As shown in FIGS. 5A–5C, method 500 first diverges from method 400 at step 510. Thus, once the points have been identified in step 428, method 500 moves to step 510 where a shrinking procedure is used on the points of each target that failed to exceed the threshold value. The shrinking procedure removes points that are on the border of middle region 134 and the more reflective outer region 136 to form a reduced middle group of points for each target. Shrinking procedures that perform this function are well known in the art.

Following this, method 500 moves to step 512 to fit a plane to the reduced middle group of points for each target. The plane represents the plane that the tie-point target lies in. Next, method 500 moves to steps 514, 516, and 518 which are the same as steps 430, 432, and 434, respectively.

Following this, method 500 moves to step 520 to project a ray from location of the scanner 110 through the centroid point of each target and determine the intersection of this ray with the plane previously fit from middle region 134 in step 512. The resulting intersection of the ray and the plane of each target is labeled as the location of the tie-point target in step 522. The tie point can then be used for registration or other operations.

The advantage of step 520 is that it has been observed that for some types of laser scanners the most accurate range measurements are made when the intensities are not at their extreme values (bright or dim). Therefore, for the scanners whose range error increases at intensity extremes, the range information associated with the centers of the bright points is can be discarded. Instead, only angular information given by the ray from scanner 110 to the bright point is used. The angular information is combined with the more accurate ranging information of the points that line on medium region 134 to generate the final estimate. Some registration methods, such as bundle adjustment, use only angular information for each point relative to the scanner location, in which case the range value for the target is not needed. For these cases it is not necessary to fit the plane, as described here, since the depth from the scanner is not needed.

In addition to using target 112, predefined geometric shapes that are distinguishable from the structure can also be used as targets. For example, if the tie-point targets were 150 mm diameter spheres rather than the thin planar objects shown in FIG. 1 (which absent the reflective regions could not be distinguished from the structure), then the method of the present invention could search for circular arcs along each scan line that have a radius smaller than the known target diameter.

If adjacent scan lines were detected to have circular arcs at similar locations, then the data could automatically be combined and a sphere of known diameter fit to the points along the circular arcs. In this way an object of a particular geometry could be detected without relying on the intensity value that is only available with some scanning devices.

One of the advantages of using predefined geometric shapes as targets is that a search for circular arcs is much simpler process than a modeling process and can be performed without user intervention. When geometric objects, such as a spherical gas tank, naturally exist in a view, the objects must first be modeled. On the other hand, when a predefined geometric shape is utilized, no modeling is required as the system need only search for a known pattern. Further, a reflective pattern similar to the pattern of target 112 can be used with the geometric shapes to further increase reliability.

Thus, a system and a method have been described for acquiring tie-point target locations on a structure. One of the advantages of the present invention is that by using reflective targets, the present invention reduces the input of the user to merely rejecting bright spots that are not associated with the targets. Further, if geometric shapes are used, the present invention eliminates the need for a user to manually identify any target locations.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A system that acquires tie-point target locations from a scan of a structure, the structure having a plurality of surfaces, the system comprising:
   a plurality of tie-point targets applied to at least one of said plurality of surfaces;
   a scanner for scanning the structure with a laser beam and detecting the laser beam reflected from the structure in order to generate a plurality of points, each point having point data that defines a spot on a surface of the structure; and
   a computer that controls the scanner and processes the plurality of points, the computer identifying points in the plurality of points that correspond to said plurality of tie-point targets, the computer forming a group of target points for each tie-point target and determining a tie-point target location in each group of target points.

2. The system of claim 1 wherein a tie-point target of the plurality of tie-point targets has a geometric shape that is distinguishable from the structure.

3. The system of claim 2 wherein the tie-point target includes a reflective region.

4. The system of claim 1 wherein a target of the plurality of tie-point targets includes:
   a center region having a first reflectance;
   a middle region that surrounds the center region, the middle region having a second reflectance less than the first reflectance; and
   an outer region that surrounds the middle region, the outer region having a third reflectance greater than the second reflectance.

5. A system that acquires tie-point target locations from a scan of a structure, the structure having a plurality of surfaces, the system comprising:
   a plurality of tie-point targets;
   a laser for scanning the structure with a laser beam to generate a plurality of points, the laser beam illuminating the tie-point targets during the scan, each point having point data that defines a spot on a surface of the structure; and
   a computer that controls the laser and processes the plurality of points, the computer including:
     means for forming a number of groups of target points from the plurality of points, each group of target points having a recognizable feature:
     means for selecting a number of groups of target points for acquisition to form a number of selected groups of target points;
     means for forming a designated point for the recognizable feature in each selected group of target points, the designated point representing the recognizable feature in each selected group of target points; and
     means for labeling the designated point in each selected group of target points as a tie-point location;
   wherein a target of the plurality of tie-point targets includes:
     a center region, the center region having a reflectance;
     a middle region that surrounds the center region, the middle region having a reflectance, the reflectance of the middle region being less than the reflectance of the center region; and
     an outer region that surrounds the middle region, the outer region having a reflectance, the reflectance of the outer region being greater than the reflectance of the middle region.

6. A system that acquires tie-point target locations from a scan of a structure, the scan generating a plurality of points, each point having point data that defines a spot on a surface of the structure, the structure having a plurality of surfaces, the system comprising:
   means for forming a number of groups of target points, each group of target points having a recognizable feature;
   means for selecting a number of the groups of target points for acquisition to form a number of selected groups of target points;
   means for forming a designated point for the recognizable feature in each selected group of target points, the designated point representing the recognizable feature in each selected group of target points; and
   means for labeling the designated point in each selected group of target points as a tie-point location;
   wherein the means for forming groups of target points includes:
     means for identifying points from the plurality of points that have a distinct intensity that exceeds a threshold value to form a group of high-intensity points;
     means for assigning each point in the group of high-intensity points to the number of groups of target points; and
     means for calculating a number of target point centroids by calculating a target point centroid for each group of target points,
     wherein the target point centroids form recognizable features.

7. The system of claim 6 wherein the means for selecting a number of groups of target points for acquisition includes means for selecting a number of the target point centroids for acquisition to form a number of selected first centroids.

8. The system of claim 7 wherein the means for forming a designated point for the recognizable feature in each selected group of target points includes:
   means for re-scanning a number of first target regions to form a plurality of first re-scanned points for each first target region, each first target region including a selected first centroid;
   means for identifying points from the plurality of first re-scanned points from each first target region that have an intensity that exceeds the threshold value to form a group of second target points for each first target region;
   means for calculating a number of second centroids by calculating a second centroid for each group of second target points from the points in each group of second target points;
   means for re-scanning a number of second target regions to form a plurality of second re-scanned points for each second target region, each second target region including a second centroid; and
   means for forming the designated point from the plurality of second re-scanned points of each second target region.

9. The system of claim 8 wherein the means for forming the designated point includes:
   means for identifying points from the plurality of second re-scanned points for each second target region that have an intensity that exceeds the threshold value to form a group of third target points for each second target region, each group of third target points having points associated with a center area and points associated with an outer area;

means for eliminating points from each group of third target points associated with the outer area to form a plurality of groups of fourth target points; and means for calculating a third centroid for each group of fourth targets points.

10. The system of claim 9 wherein the means for labeling the designated point includes means for labeling each third centroid as a tie-point location.

11. The system of claims wherein the means for forming the designated point includes:

means for identifying points from the plurality of second re-scanned points for each second target region that have an intensity that exceeds the threshold value to form a group of third target points for each second target region, each group of third target points having points associated with a center area and points associated with an outer area;

means for forming a group of fourth target points for each second target region from points that fail to exceed the threshold value;

means for removing border points from each group of fourth target points to form a number of middle groups of points;

means for fitting a plane to points in each middle group of points;

means for eliminating points from each group of third target points associated with the outer area to form a plurality of groups of fifth target points; and means for calculating a third centroid for each group of fifth target points.

12. The system of claim 11 wherein the means for labeling the designated point includes means for projecting a ray through each third centroid to determine an intersection of the ray from the scanner location with the plane.

13. A method for acquiring tie-point target locations from a scan of a structure, the method comprising the steps of:

applying a number of tie-point targets to the structure;

scanning the structure with a laser beam and detecting the laser beam reflected from the structure in order to generate a plurality of points, each point having point data that defines a spot on a surface of the structure;

forming a group of target points for each tie-point target by identifying points in the plurality of points that correspond to that tie-point target; and determining a tie-point target location in each group of target points.

14. The method of claim 13 wherein a tie-point target of the number of tie-point targets has a geometric shape that is distinguishable from the structure.

15. The method of claim 14 wherein the tie-point target includes a reflective region.

16. A method for acquiring tie-point target locations from a scan of a structure, the method comprising the steps of:

applying a number of tie-point targets to the structure;

scanning the structure with a laser beam to generate a plurality of points, the laser beam illuminating the tie-point targets during the scan, each point having point data that defines a spot on a surface of the structure;

forming a number of groups of target points from the plurality of points, each group of target points having a recognizable feature;

selecting a number of groups of target points for acquisition to form a number of selected groups of target points;

forming a designated point for the recognizable feature in each selected group of target points, the designated point representing the recognizable feature in each selected group of target points; and labeling the designated point in each selected group of target points as a tie-point location;

wherein a tie-point target of the number of tie-point targets includes:

a center region, the center region having a reflectance;

a middle region that surrounds the center region, the middle region having a reflectance, the reflectance of the middle region being less than the reflectance of the center region; and an outer region that surrounds the middle region, the outer region having a reflectance, the reflectance of the outer region being greater than the reflectance of the middle region.

17. A method for acquiring tie-point target locations from a scan of a structure, the scan generating a plurality of points, each point having point data that defines a spot on a surface of the structure, the structure having a plurality of surfaces, the method comprising the steps of:

forming a number of groups of target points, each group of target points having a recognizable feature;

selecting a number of the groups of target points for acquisition to form a number of selected groups of target points; and forming a designated point for the recognizable feature in each selected group of target points, the designated point representing the recognizable feature in each selected group of target points; and labeling the designated point in each selected group of target points as a tie-point location;

wherein the step of forming groups of target points includes the steps of:

identifying points from the plurality of points that have an intensity that exceeds a threshold value to form a group of high-intensity points;

assigning each point in the group of high-intensity points to the number of groups of target points; and calculating a number of target point centroids by calculating a target point centroid for each group of target points, wherein the target point centroids form recognizable features.

18. The system of claim 17 wherein the step of selecting a number of the groups of target points for acquisition includes the step of selecting a number of target point centroids for acquisition to form a number of selected first centroids.

19. The method of claim 18 wherein the step of forming a designated point for the recognizable feature in each selected group of target points includes the steps of:

re-scanning a number of first target regions to form a plurality of first re-scanned points for each first target region, each first target region including a selected first centroid;

identifying points from the plurality of first re-scanned points from each first target region that have an intensity that exceeds the threshold value to form a group of second target points for each first target region;

calculating a number of second centroids by calculating a second centroid for each group of second target points from the points in each group of second target points;

re-scanning a number of second target regions to form a plurality of second re-scanned points for each second target region, each second target region including a second centroid; and forming the designated point from the plurality of second re-scanned points of each second target region.

20. The system of claim 19 wherein the step of forming the designated point includes the steps of:

identifying points from the plurality of second re-scanned points for each second target region that have an intensity that exceeds the threshold value to form a group of third target points for each second target region, each group of third target points having points associated with a center area and points associated with an outer area;

eliminating points from each group of third target points associated with the outer area to form a plurality of groups of fourth target points; and calculating a third centroid for each group of fourth targets points.

21. The method of claim 20 wherein the step of labeling the designated point includes the step of labeling each third centroid as a tie-point location.

22. A system for determining the locations of tie-point targets applied to a structure, comprising:

a plurality of tie-point targets applied to the structure;

a scanner operable to scan the structure with a laser beam and detect the laser beam reflected from the structure at a plurality of scan locations in order to generate a plurality of data points; and a processor for identifying data points that correspond to each of said plurality of tie-point targets and grouping those data points into groups of target points, the processor capable of determining a tie-point target location for each group of target points.

23. The system of claim 22, wherein:

the processor identifies data points that correspond to each of said plurality of tie-point targets by determining whether an intensity detected for each data point exceeds a threshold intensity.

24. The system of claim 22, wherein:

the processor groups data points into groups of target points using at least one distance threshold.

25. The system of claim 22, wherein:

each of the plurality of tie-point targets has a geometric shape that is distinguishable from the structure, and the processor groups data points based on the geometric shape.

26. The system of claim 22, wherein:

the processor is capable of directing the scanner to capture additional data points near each tie-point target location, the additional data points being captured at a higher resolution in order to more accurately determine the tie-point target location.

27. The system of claim 22, wherein:

the processor determines the tie-point target location for each group of target points by calculating a centroid location for that group of target points.

28. The system of claim 22, wherein:

each of said plurality of tie-point targets has at least two regions of different reflectance.

29. The system of claim 22, wherein:

each of said plurality of tie-point targets has a reflectance distinguishable from a surface reflectance of the structure.

30. A method for determining the locations of tie-point targets applied to a structure, comprising the steps of:

applying a plurality of tie-point targets to the structure;

scanning the structure with a laser beam and detecting the laser beam reflected from the structure at a plurality of scan locations in order to generate a plurality of data points;

identifying data points in the plurality of data points that correspond to each of said plurality of tie-point targets and grouping those data points into groups of target points;

determining a tie-point target location for each group of target points; and scanning the structure at a higher resolution near at least one tie-point target location in order to more accurately determine that tie-point target location.

31. The method of claim 30, wherein:

identifying data points that correspond to each of said plurality of tie-point targets includes determining whether an intensity detected for each data point exceeds a threshold intensity.

32. The method of claim 30, wherein:

grouping data points into groups of target points includes using at least one distance threshold.

33. The method of claim 30, wherein:

grouping data points into groups of target points includes grouping data points based on a geometric shape of each of the plurality of tie-point targets that is distinguishable from the structure.

34. The method of claim 30, wherein:

determining the tie-point target location for each group of target points includes calculating a centroid location for that group of target points.

* * * * *